UNITED STATES PATENT OFFICE.

ANNA FIELD, OF SPRINGFIELD, MASSACHUSETTS.

IMPROVEMENT IN MEDICAL COMPOUNDS OR LOTIONS FOR THE SKIN.

Specification forming part of Letters Patent No. 140,126, dated June 24, 1873; application filed June 7, 1873.

*To all whom it may concern:*

Be it known that I, Mrs. ANNA FIELD, of Springfield, Hampden County, State of Massachusetts, have invented a new and useful Improved Lotion for removing tan, freckles, and other discolorations from the skin, while at the same time otherwise improving it upon application.

My improved compound consists of the following ingredients, united in substantially the following proportions: Benzoin, two ounces; citric acid, one-half ounce; borax, one dram; dissolved and held by alcohol, one pint.

The citric acid removes the scarf-skin, but not sufficiently to create soreness. The borax takes up the grease upon its surface, and the benzoin smooths and tends to heal any abrasion. The alcohol, while affording the vehicle to hold these ingredients, exercises itself a favorable influence upon the skin, to, in connection with the benzoin, harden it and prevent it from creasing or wrinkling.

My lotion can be conveniently applied with a soft rag or sponge, after having its strength slightly reduced by water.

Its application cleanses the pores of the skin, and gives the skin itself a soft texture and healthy color.

What I claim is—

The solution of the above-mentioned ingredients in substantially the same proportions.

MRS. ANNA FIELD.

Witnesses:
    B. F. HYDE,
    A. M. COPELAND.